US006700919B1

(12) United States Patent
Papasakellariou

(10) Patent No.: US 6,700,919 B1
(45) Date of Patent: Mar. 2, 2004

(54) CHANNEL ESTIMATION FOR COMMUNICATION SYSTEM USING WEIGHTED ESTIMATES BASED ON PILOT DATA AND INFORMATION DATA

(75) Inventor: Aris Papasakellariou, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/452,066

(22) Filed: Nov. 30, 1999

(51) Int. Cl.[7] ................................................. H04B 1/69
(52) U.S. Cl. ...................... 375/130; 375/208; 375/200; 375/267; 375/279; 375/329; 370/515; 370/206
(58) Field of Search ............................... 375/208, 200, 375/267, 279, 329, 130; 370/515, 206

(56) References Cited

U.S. PATENT DOCUMENTS 5,553,098 A * 9/1996 Cochran et al. ............ 375/324
5,901,185 A * 5/1999 Hassan ....................... 375/346

OTHER PUBLICATIONS

S. Min and K. B. Lee"Pilot and Traffic Based Channel Estimation for DS/CDMA Systems", IEEE, pp. 1073–1074, May 1998.

* cited by examiner

Primary Examiner—Stephen Chin
Assistant Examiner—Guillermo Munóz
(74) Attorney, Agent, or Firm—Frederick J. Telecky, Jr.; W. James Brady, III

(57) ABSTRACT

A method (50) of operating a communications receiver (20). The method receives a communications signal (10) which is transmitted via a channel, where the communications signal comprises received known pilot data ($D_P$) and received information data ($D_I$), the known pilot data and information data being sequentially transmitted. The method then estimates a first channel impulse response (52) for the channel, wherein the first channel impulse response is in response to the received pilot data. Next, the method determines (54) a group of estimated information data in response to the first channel impulse response. Next, the method estimates a second channel impulse response (56) for the channel in response to the estimated information data. Thereafter, the method forms (56) a combined channel impulse response for the channel, using differing weights as applied to the first and second channel impulse responses.

22 Claims, 2 Drawing Sheets

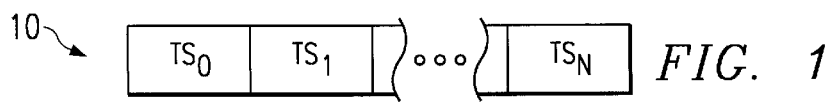
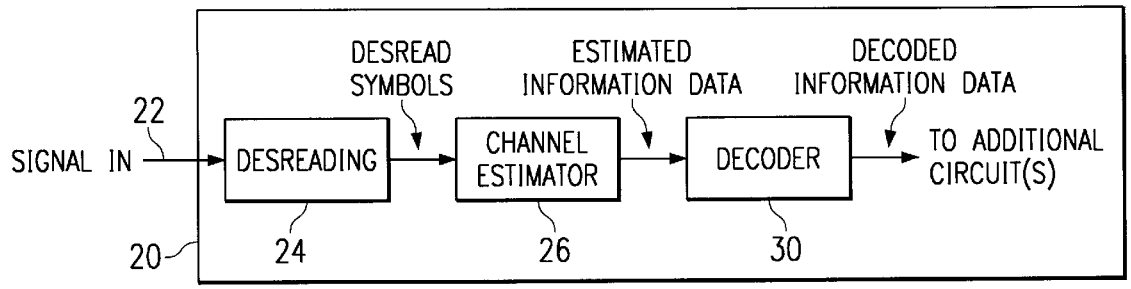
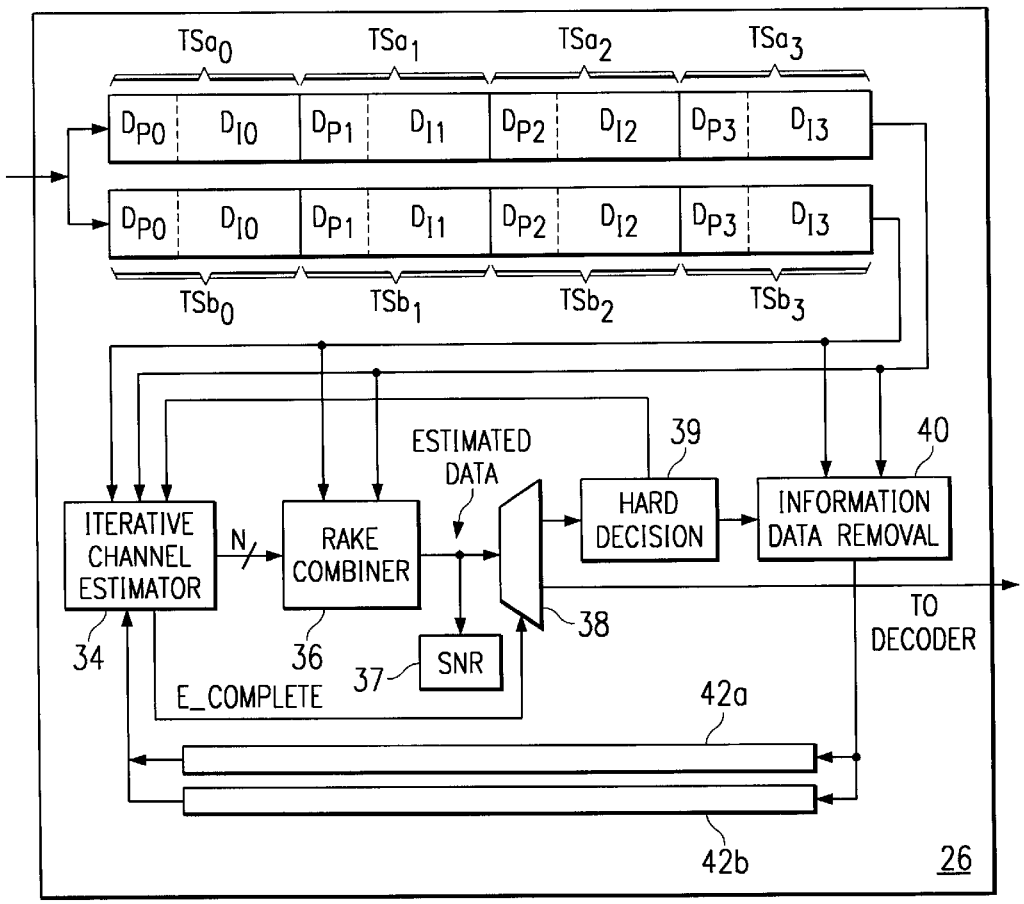

CHANNEL ESTIMATION FOR COMMUNICATION SYSTEM USING WEIGHTED ESTIMATES BASED ON PILOT DATA AND INFORMATION DATA

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to communications systems where pilot data is transmitted along with the information data and, more particularly, to channel impulse response estimation in such systems.

In various digital communications environments, the transmitted signal includes information data and, in addition, the transmitted signal includes control data to be used by the receiver for optimizing the communication accuracy between the transmitter and the receiver. One type of such control data is referred to in the art as pilot data, where pilot data is used in the prior art by a receiver to estimate the channel impulse response. This channel estimate is then used to adjust the demodulator of the receiver in an effort to accurately detect the information data. While channel impulse response estimation has been determined using the pilot signal, an improvement on that approach is set forth in U.S. patent application Ser. No. 09/294,722, entitled "Channel Estimation For Communication System With Pilot Transmission," filed Apr. 19, 1999, and hereby incorporated herein by reference ("the '722 application"). In the '722 application, its inventor achieves an improved channel impulse response estimation at a receiver by determining two estimates, and then combining those estimates to form a single estimate. More specifically, the receiver determines a first channel impulse response estimate based on the pilot data. The approach assumes that the pilot data and information data are transmitted sequentially after each other, that is the information data transmission begins once the pilot data transmission ends and vice versa. Based on that channel response, the receiver makes a preliminary decision on the information data by using, for example, the typical RAKE receiver approach. Once decisions for the information data become available, they can be used to produce a known, constant symbol stream for the information data. This known information symbol stream is then used together with the already known pilot data stream to form a single combined symbol stream which is then used to provide a new channel estimate. Given an acceptable level of accuracy for the preliminary decisions on the information data and the fact that the information data are typically considerably more numerous than the pilot data, the new channel estimate will be more accurate than the initial one which was based solely on the pilot data. Using the new channel estimate, new decisions on the information data are performed. Because of the better accuracy of the new channel estimate, the new information data decisions can also be more accurate. The channel estimation, information data decision process can then be iteratively repeated, using the new, more accurate information data decisions at each step of the iterative process.

While the approach of the '722 application has been shown to improve upon the prior art approach of using only pilot data to estimate channel impulse response, the present inventor has recognized possible drawbacks of the prior approaches where even greater accuracy is desired. Accordingly, there arises a need to further improve the accuracy of the prior art approaches as is achieved by the preferred embodiment described below. The need to improve the accuracy of the channel estimate using both pilot data and information data has also been examined by S. Min and K. B. Lee in "Pilot and Traffic Based Channel Estimation for DS/CDMA Systems", IEEE, pages 1073–1074, May 1998. In that study, a continuous pilot signal was transmitted in the Q branch of a QPSK signal while the I branch also continuously carried information data. In the present invention, however, and as explored below, the pilot data and information data are transmitted sequentially; that is no pilot data is transmitted when information data is transmitted and vice versa.

BRIEF SUMMARY OF THE INVENTION

In the preferred embodiment, there is a method of operating a communications receiver. The method receives a communications signal which is transmitted via a channel, where the communications signal comprises received known pilot data and received information data, the known pilot data and information data being sequentially transmitted. The method then estimates a first channel impulse response for the channel, wherein the first channel impulse response is in response to the received pilot data. Next, the method determines a group of estimated information data in response to the first channel impulse response. Next, the method estimates a second channel impulse response for the channel in response to the estimated information data. Thereafter, the method forms a combined channel impulse response for the channel. The combined channel impulse response is in response to the estimated information data and the known pilot. The combined channel impulse response is in response to a combination of a first weight applied to the first channel impulse response and a second weight applied to the second channel impulse response, wherein the first weight differs from the second weight. Other circuits, systems, and methods are also disclosed and claimed.

BRIEF DESCRIPTION OF THE SEVERAL VIEWS OF THE DRAWING

FIG. 1 illustrates a diagram of a slotted communications stream.

FIG. 2 illustrates functional block diagram of a receiver 20 according to the preferred embodiment.

FIG. 3 illustrates a functional block of channel estimator 26 of FIG. 2.

DETAILED DESCRIPTION OF THE INVENTION

Figure 4:
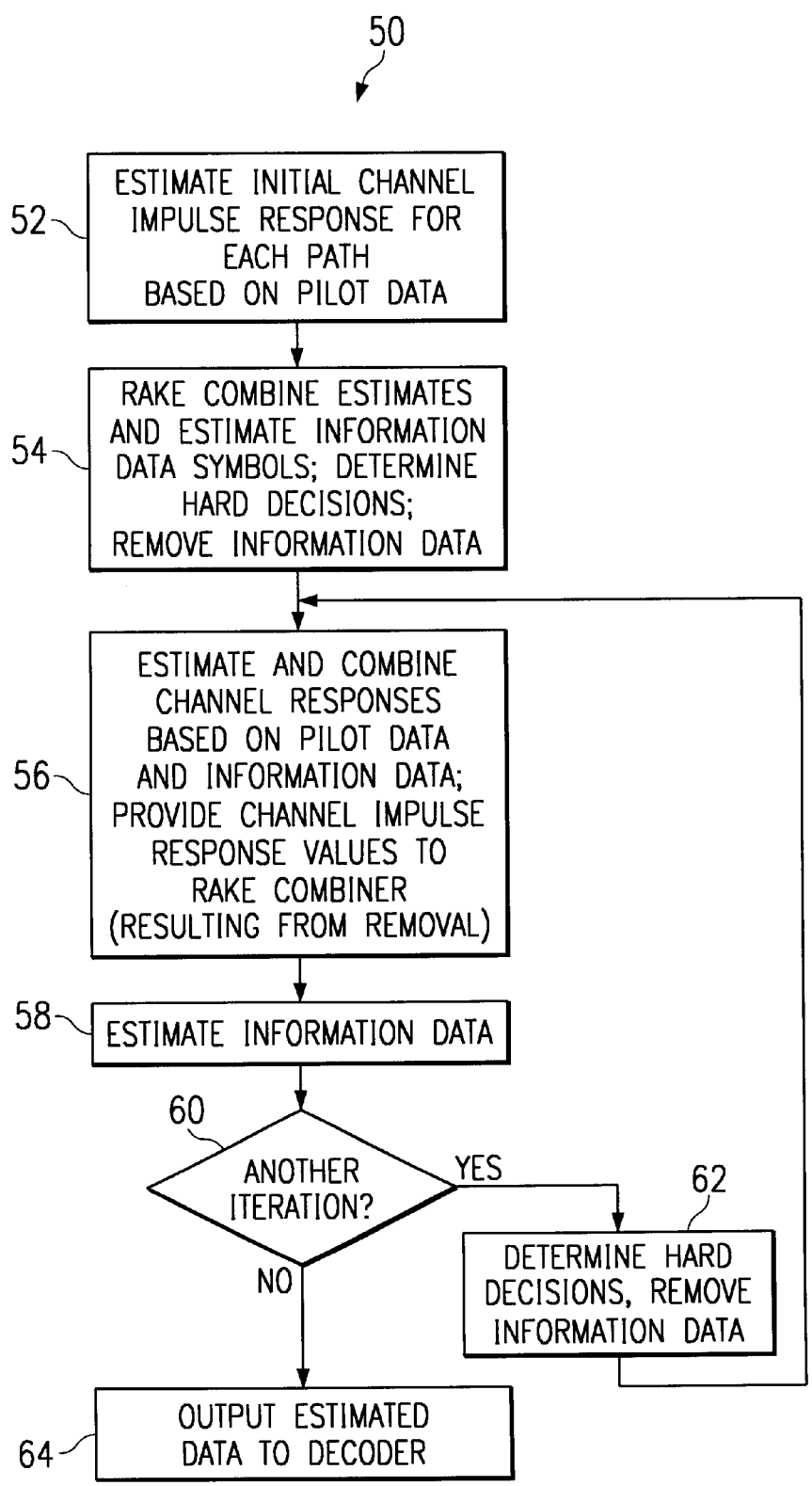
FIG. 4 illustrates a preferred method of operation of the iterative channel estimator 34 of FIG. 3.

While the present embodiments apply generally to various communications of digital data where the data includes both information data and pilot data, a particularly useful implementation is in mobile wireless communications and, accordingly, the preferred embodiment is now described by way of example in this field. Various standards for mobile wireless communications systems have emerged, including frequency division multiple access ("FDMA"), time division multiple access ("TDMA"), and code division multiple access ("CDMA"). FDMA divides a communications channel into different frequency slots, where a user (e.g., mobile caller) is assigned a frequency slot unique from other slots so as not to interfere with communications of other users. TDMA divides a communications channel into different time slots for a given frequency, and a user's communication is inserted in time into a unique time slot, again so as not to interfere with communications of other users. In contrast, CDMA systems do not reserve one frequency band or time slot per user and are distinguishable from FDMA and TDMA in at least two noteworthy aspects, each of which is discussed below.

A first aspect of CDMA is that it allows simultaneous transmission of information over a common frequency channel by spreading the energy of the communication, that is, it utilizes spread spectrum technology. The resulting signal has a low-power spectral density in any portion of the band. By way of further background to this aspect, note that in a wireless environment a signal transmitted from one point to another arrives via many paths. This is because the transmitted signal is reflected by objects such as the ground, mountains, buildings, and other things which it contacts. These multiple signals eventually arrive at some received point with different phase and amplitude and are referred to in the art as multiple paths or multipaths, where they all add and subtract with each other, resulting, at times, in deep "fades" where there is very little signal strength. In some cases, the reception may be completely disabled. Furthermore, the multipath phenomenon is variable and unpredictable depending upon the locations of the transmitter and receiver, and it changes with time as the environment changes. Notwithstanding these numerous obstacles, CMDA reduces the drawbacks of multipath effects by spreading the data energy over a bandwidth that is larger than the information data rate and efficiently collecting the spread information energy (i.e., despreading) at the receiver. In general, the wider the bandwidth, the more resistant the signal is to multipath fading. Multipaths separated in time by more than one element of the spreading code (called chip) are distinguishable at the receiver and can be demodulated separately. Subsequently, the demodulated multipaths are combined according to some method, such as the maximal ratio combining (MRC), using a RAKE receiver. Because such paths fade independently, even when one or more of them experience a deep fade, the remaining may be received with adequate energy and provide reliable communication. Because the duration of a chip is typically considerably smaller than the duration of an information data symbol, such separation of multipaths and individual demodulation is possible. Thus, while multipath signal fading may cause the narrow band cellular type signal such as FDMA or TDMA to be diminished considerably, only a very small portion of the CDMA energy is lost. Although this unique communication scheme has been known for several decades, the dramatic cost reduction brought about by the advent of integrated digital high speed custom components has recently made commercialization feasible.

A second aspect of CDMA is that it allows simultaneous transmission of information over a common channel by assigning each of the transmitted signals a unique code during transmission. This unique code makes the simultaneously transmitted signals over the same bandwidth distinguishable at the receiver. More particularly, the CDMA transmitter modulates each data symbol by combining it, or multiplying it times, with a CDMA spreading sequence which can be a pseudo-noise ("PN") digital signal or PN code, an orthogonal code (Walsh code), or any other spreading code or combinations of such codes such as a Walsh code superimposed (modulo-2 added) with a PN-type code. The CDMA digital signal is a code consisting of a series of binary pulses, and is given its name because the resulting product it creates makes the signal appear wide band and "noise like." The CDMA code runs at a higher rate than the symbol data rate and determines the actual transmission bandwidth. In the current industry, each piece of CDMA signal transmitted is said to be divided into "chips," where each chip corresponds to an element in the CDMA code and, thus, the chip frequency defines the rate of the CDMA code. Messages also can be cryptographically encoded to any level of secrecy desired with direct sequencing as the entire transmitted/received message is purely digital. At the receiving end, a CDMA receiver uses a locally generated replica CDMA code synchronized with the arrival time of a desired path and a receiver correlator to separate the desired path from all other signals and paths. A CDMA correlator can be thought of as a matched filter, that is, it responds only to signals that are encoded with a CDMA code that matches its own code. Thus, the CDMA correlator can be "tuned" to different signals simply by changing its local code. The correlator does not respond to man made, natural or artificial noise or interference. It responds only to spread spectrum signals with identical matched signal characteristics and encoded with the identical CDMA code. With correct timing and other appropriate receiver setup, the correlation result will produce the original transmitted signal, affected by the channel and interference/noise, while the remaining interfering signals will appear noise-like. This is a direct consequence of the pseudo-noise property of CDMA codes. All CDMA users can thus share the same frequency channel because their conversations are distinguished by a unique digital code. Not surprisingly, this communications method is inherently private.

By way of additional introduction, FIG. 1 illustrates a data format 10 used in CDMA communications. Data format 10 includes a number of time slots $TS_0$, $TS_1$ and so forth through $TS_N$. Each time slot has a same duration and a same number of symbols, where a typical contemporary example is 0.625 milliseconds in duration. Further, each time slot includes what has been and will be referred to in this document as pilot data and information data. The pilot data is data that is known to both the transmitter and receiver and is inserted into the format for channel impulse response estimation purposes and other receiver functions. Typically, the pilot segment of the slot is considerably smaller than the data segment because the pilot carries no information and it is desirable to minimize such overhead. Therefore, as implemented in the preferred embodiment, using the typically more numerous information data, in addition to the pilot data, will result an improved channel estimate. The information data represents what is typically user information, such as speech data in the context of cellular mobile phone communications or any other type of data such as text or video. Information data is often referred to in less precise contexts as just "data;" however, for accuracy and consistency in this document, the term "data" alone is intended to include both pilot data and information data, since both are represented by symbols in format 10. In all events, once the data is placed in format 10, it is transmitted using the spread energy and code combining techniques described above.

Having detailed format 10, and to further elaborate on what was introduced in the earlier Background Of The Invention section of this document, note that in the prior art the pilot data is used in what is referred to as a pilot symbol assisted method of channel impulse response estimation. More particularly, each symbol in format 10 represents a complex number and, thus, may be represented by a value $d_n A_n e^{j\Theta_n}$ where n denotes the $n^{th}$ path out of a total of N demodulated paths. In this regard, note that "$d_n$" portion represents the actual pilot or information value transmitted, while the $A_n e^{j\Theta_n}$ portion represents the effects of the channel impulse response on the data, where $A_n$ is the amplitude scaling and $e^{j\Theta_n}$ is the phase rotation introduced by the channel. Further, in the prior art when the receiver receives a group of pilot symbols corresponding to one time slot, the actual pilot data symbols in that group (i.e., $d_n$) are already known. As a result, the remaining value $A_n e^{j\Theta_n}$ from the product $d_n A_n e^{j\Theta_n}$ for those symbols may be determined by removing the known term $d_n$. In this manner, the effect of the channel impulse response on the received pilot data is known. Additionally, this same value and effect is used as an estimate of the channel effect on the information data. In other words, the determined value $A_n e^{j\Theta_n}$ defines an estimated phase shift and amplitude distortion of the information data near (e.g., immediately before or after) the pilot data. This is because the channel response remains practically the same over a few symbols for the data rates and mobile speeds of interest. Thereafter, a complex conjugate of the estimate is multiplied times the received information data in an effort to remove the effect of phase rotation from the channel response on that data and weigh each path according to its energy, as required to perform MRC, thereby attempting to accurately identify the term $d_n$ for the information data. Lastly, while the preceding has discussed using a single group of pilot symbols, in another approach several successive pilot symbols may be used for correction (e.g., such as through an averaging technique).

Additional detail is now provided regarding the '722 application which also was introduced in the earlier Background Of The Invention section of this document. First, recall that it is earlier stated that the '722 application improves channel impulse response estimation by using both the pilot data and the information data to estimate the channel impulse response. Having now illustrated format 10 in FIG. 1, it may be appreciated that the number of symbols in the information data are much greater than those in the pilot data. Given this aspect, the '722 application first establishes an estimate from the pilot data, and uses it to remove the channel effects from the received information data by removing the phase rotation and scaling according to the path energy, thereby creating a first corrected information data result. Next, the process is repeated one or more times, where in these successive instances both the pilot data and information data are used to create a combined channel estimate, where the combined channel estimate is used as above. Additional refinements may be made in the channel estimate in view of the corrected information. This process may repeat additional times in an iterative fashion until a desired level of reduced error is achieved.

The present inventor recognizes various limitations with the approach of the '722 application, and now sets forth the preferred embodiment which overcomes these limitations. To better appreciate these aspects of the preferred embodiment, it is instructive to review the inventor's observations regarding the technology of the '722 application. As a first observation, note that the '722 application combines the estimates from the pilot data and the information data with no distinction between the two. However, the present inventor observes that the value of the estimated channel impulse response insofar as it is derived based on the pilot data should be considered differently than the value of the estimated channel impulse response insofar as it is derived based on the information data. For example, the estimated channel impulse response based on the pilot data will tend to be more accurate than the value based on the information data because the pilot data is in fact known while the information data is estimated and is therefore subject to errors. As another example, the estimated channel impulse response based on the pilot data may be more or less accurate than the value based on the information data because the information data and pilot data may have different powers in which case the estimates based on each may have differing reliability. As a result of these variations, the preferred embodiment gives different weights to each of these two estimates, as will be explained below.

FIG. 2 illustrates a block diagram of a receiver 20 according to the preferred embodiment, which is now introduced generally in terms of its structure and operation. Before proceeding, it is noted that the blocks of FIG. 2 and later Figures are shown and described relative to the function of each, where the actual circuitry, software, and/or firmware used to achieve such functionality may be implemented using a digital signal processor or in various other manners as may be ascertained by one skilled in the art. Turning to receiver 20, it receives a CDMA signal at the chip rate at an input 22, and that input is connected to a despreading block 24. Despreading block 24 operates according to known principles, such as by multiplying the CDMA signal times the CDMA code for receiver 20, thereby producing a despread symbol stream at its output at the symbol rate. Given format 10 of FIG. 1, the symbol stream includes both pilot data symbols and information data symbols. The despread signals output by despreading block 24 are coupled to a channel estimator 26. As discussed in much greater detail later, channel estimator 26 iteratively determines and refines an estimated channel impulse response based on the incoming despread data. Once the estimated channel response reaches a satisfactory level, after which further symbol-error-rate improvements are negligible, channel estimator 26 outputs a group of estimated information data corresponding to the refined estimated response. The estimated information data is provided to a decoder circuit 30, which may include a deinterleaver, a Viterbi decoder or a turbo decoder, or other appropriate decoding schemes as known in the art. Decoder 30 further decodes the corrected symbols, typically operating with respect to certain error correcting codes, and outputs a resulting stream of decoded symbols. Indeed, note that the probability of error for data input to decoder 30 is far greater than that after processing and output by decoder 30. For example, under current standards, the probability of error in the output of decoder 30 may be between $10^{-3}$ and $10^{-6}$. Finally, the decoded symbol stream output by decoder 30 may be received and processed by additional circuitry in receiver 10, although such circuitry is not shown in FIG. 2 so as to simplify the present illustration and discussion.

FIG. 3 illustrates a block diagram of channel estimator 26 from FIG. 2 in greater detail and according to the preferred embodiment, and the discussion of it begins with its inclusion of one or more buffers 32. Each buffer 32 stores a number of time slots of received symbols, and recall from FIG. 2 that these symbols have been despread by despreading block 24. The number of buffers corresponds to the number of paths of received data. More particularly, recall that multipath reflections will likely cause receiver 20 to receive different paths of the same information, that is, the same information may be received at multiple times by receiver 26 due to reflections or other delay-causing factors. In view of this likelihood, receiver 26 includes what is referred to in the art as a searcher (not shown) which operates to initially determine the number of distinguishable paths, which typically are paths separated in time by more than 1 chip interval, received for a given communication, and it establishes a buffer for each of these paths after despreading. By way of a simple example, FIG. 3 illustrates the case of two paths and, hence, each path has a respective buffer 32a and 32b. By way of example, each buffer 32 is shown as storing four times slots of received symbols, and these symbols are shown as $TSa_0$ through $TSa_3$ for buffer 32a, and $TSb_0$ through $TSb_3$ for buffer 32b. As described earlier, each time slot includes pilot data and information data, and for the sake of reference these data "D" are also labeled with an indicator of the path (i.e., either "a" or "b") and with a subscript identifying the type of data (i.e., "P" for pilot, "I" for information) and the time slot (e.g., "0" for time slot $TS_0$, "1" for time slot $TS_1$, and so forth). Finally, note that each path stores information which when originally transmitted to receiver 20 was identical information, but which may differ in buffers 32a and 32b due to the differing channel characteristic for each path (amplitude and phase distortion).

Continuing with channel estimator 26, each buffer 32 is coupled so that its information is available as an input to an iterative channel estimator block 34. The operation of iterative estimator block 34 is detailed below in FIG. 4; at this point by way of introduction, note that estimator block 34 determines a channel impulse response for each path (i.e., corresponding to each buffer 32) in an iterative fashion such that the estimate is preferably refined to a more accurate value for each iteration. For purpose of reference, let the number of paths be N paths and, thus, estimator block 34 determines N estimates. Estimator block 34 outputs its N estimates to an input of a rake combiner 36, where each estimate is preferably in the form of a complex number representing the estimated amplitude and phase adjustment imposed by the channel on the despread data.

Rake combiner 36 is given its name in the art to suggest the notion of a yard rake having "fingers," where each finger corresponds to a different path in the received multipath communication. As its name suggests, rake combiner 36 combines each of these fingers or paths and, in doing so, it outputs a single symbol stream (not a "path"). More particularly, the single stream is the result of the operation of rake combiner 36 which corrects each of the fingers (or paths) according to its corresponding channel estimate, and then combines the results typically using what is referred to in the art as maximal ratio combining. For example, in one prior art approach, a rake combiner multiples the symbols from each path times the complex conjugate of the channel estimate corresponding to the path, and then, after adjusting for the different path delays, it sums the corresponding result for each path. These operations reduce the effects of fading and improve the signal-to-noise ratio ("SNR"), and ultimately produce a single symbol stream which is an estimate of the transmitted information data (also referred to as "soft data"). The single symbol stream output of rake combiner 36 is connected to an input of an SNR measurement block 37, and also to an input of a demultiplexer 38.

SNR measurement block 37 is operable, as its name suggests, to measure the SNR of the output of rake combiner 36, for reasons detailed later. At this point, however, it should be understood that SNR measurements are common in wireless receivers for several reasons and, therefore, assuming such functionality already exists in receiver 20 it also may be used to measure SNR at the output of rake combiner 36.

Demultiplexer 38 is shown to demonstrate a switching operation. Specifically, demultiplexer 38 has two outputs, a first connected to an input of a hard decision block 39 and a second connected as the output of channel estimator 26. Thus, when demultiplexer 38 is switched to connect its input to its first output, then the estimated information data from rake combiner 36 is coupled to hard decision block 39, whereas if demultiplexer 38 is switched to connect its input to its second output, then the estimated information data from rake combiner 36 is output by channel estimator 26 and, as shown in FIG. 2, it therefore proceeds to decoder 30. Lastly, note that demultiplexer 38 is controlled by a signal shown as E_COMPLETE from iterative channel estimator 34, where the E_COMPLETE signal is intended as an abbreviation for estimate complete. More particularly and as introduced above, recall that iterative channel estimator 34 determines a channel impulse response for each path in an iterative fashion. Thus, based on alternative criteria discussed later, before a sufficient number of iterations have occurred, the E_COMPLETE signal is asserted in a first state such that demultiplexer 38 connects the estimated data from rake combiner 36 to hard decision block 39; however, when a sufficient number of iterations have occurred, the E_COMPLETE signal is asserted in a second state such that demultiplexer 38 connects the estimated data from rake combiner 36 to decoder 30 (of FIG. 2).

Hard decision block 39 creates what is referred to in the art as a "hard decision" with respect to each information data symbol, that is, according to its input it determines for each information data symbol in the stream whether the symbol is a logic high or low (typically represented at the symbol level as a +1 or −1). In a simple example, hard decision block examines the sign of each received information data symbol after RAKE combining, and if it is positive then block 39 decides that the symbol is a logic high ("+1") whereas if it is negative then block 39 decides that the symbol is a logic low ("−1"). Other implementations, of course, are possible and may be ascertained by one skilled in the art. In any event, these data decisions are output as a stream to an input of a data removal block 40. Alternatively, decisions for the information data may be available after decoding the information data after the Rake and subsequently re-encoding them in the same manner as they were encoded at the transmitter.

Information data removal block 40 applies the hard symbol decisions to the originally received (and despread) information data in buffers 32a and 32b (and other buffers, if applicable). In the preferred embodiment, this application is achieved by multiplying the hard decision values times the respective symbols in buffers 32a and 32b, with the results of the multiplication stored in buffers 42a and 42b, respectively. Note that this operation is referred to as "data removal" for reasons now explored. Specifically, assume by way of example that in time slot $TSa_0$ the first information data symbol is represented by the complex product $d_{a1}A_{a1}e^{j\Theta_{a1}}$, where $d_{a1}$ is the data value and $A_{a1}e^{j\Theta_{a1}}$ is the channel effect on the data value. Next, assume that hard decision block 39 has determined that $d_{a1}$ equals −1. Thereafter, information data removal block 40 multiples this decision (i.e., of −1) times the despread value in buffer 32a of $d_{a1}A_{a1}e^{j\Theta_{a1}}$; accordingly, the product of the multiplication equals $(d_{a1})^2 A_{a1}e^{j\Theta_{a1}}$. Further, if in fact the actual despread value is also −1 (as decided by hard decision block 39), then the product of $(d_{a1})^2$ will equal one (i.e., −1*−1=1). In other words, assuming the hard decision is accurate, the multiplication reduces the value of $(d_{a1})^2$ to one, thereby leaving the result of the product as only $A_{a1}e^{j\Theta_{a1}}$. For this reason, it is therefore said that the data "is removed," thereby leaving only the amplitude and phase elements imposed on the data by the channel. Following the above, note that the results of information data removal block 40, as stored in buffers 42*a* and 42*b,* are fed back to iterative channel estimator 34. As detailed below, this feedback path provides for additional iterations, thereby reducing the expected error in the channel estimate.

FIG. 4 illustrates a method 50 of operation of iterative channel estimator block 34 in combination with the operation of various other circuits already described above; before proceeding, note that method 50 may be achieved using additional control and/or state machine circuitry in receiver 20, where one skilled in the art may readily ascertain various fashions for implementing the steps now described. Turning to method 50 in general, for a number of time slots of data it determines a first channel estimate and then iteratively refines that estimate, ultimately producing estimated information data values corresponding to the refined estimate. This methodology is further explored below.

Method 50 commences with step 52, at which time estimator block 34 determines a first or initial channel impulse for each data path in response only to the pilot data in the path, and according to techniques known in the art. For example, as described above, this first channel estimation (per path) may be based on the group of pilot symbols corresponding to one time slot, where again recall that the actual pilot data symbols in that group are already known and, thus, the remaining value $A_n e^{j\theta_n}$ from the product $d_n A_n e^{j\theta_n}$ for those symbols may be determined by removing the known term $d_n$. Alternatively, several successive groups of pilot symbols in successive slots may be used for determining the initial channel estimate. Still other alternatives for determining the initial channel response for each data path in response to the pilot data may be ascertained by one skilled in the art. For example, initial channel estimation may be performed as an open loop channel estimation and can be implemented using a Wiener filter, simple averaging, or a low pass filter. In any event, a number of these estimates, based on pilot data and corresponding to the N different paths, are then output to rake combiner 36.

Step 54 represents operation of rake combiner 36, hard decision block 39, and information data removal block 40 in response to the initial N channel estimates from iterative channel estimator block 34. The reader is assumed familiar with the operation of each of these blocks as described above. Briefly, therefore, the following sub-steps are represented by step 54: (1) rake combiner 36 applies the N channel estimates to the information symbols in buffers 32*a* and 32*b* and aligns and combines the results for the N demodulated paths to provide a single stream output of estimated information data symbols; (2) E_COMPLETE is asserted in its first state so that the estimated information data symbols from rake combiner 36 pass to hard decision block 39; (3) hard decision block 39 converts the estimated information data symbols into hard decision values (i.e., +1 or −1); and (4) information data removal block 40 applies the hard decisions to the despread values in buffers 32*a* and 32*b,* thereby creating in buffers 42*a* and 42*b,* for each corresponding symbol in buffers 32*a* and 32*b,* the amplitude and phase elements imposed by the channel on those symbols.

From the preceding, one skilled in the art should appreciate that when step 56 is reached, and following the data removal provided by step 54, buffers 42*a* and 42*b* store the channel amplitude and phase distortions of the information data symbols in buffers 32*a* and 32*b,* where these values are based on the initial channel impulse response from step 52. In step 56, these values are provided to iterative channel estimator 34, and note also that the pilot data from buffers 32*a* and 32*b* are also provided to iterative channel estimator 34. In response, iterative channel estimator 34 determines an estimated channel impulse response for each path based on the pilot data (from buffers 32*a* and 32*b*) and an estimated channel impulse response for each path based on the information data (from buffers 42*a* and 42*b*). Next, and as detailed later, for each path iterative channel estimator 34 applies a weight to the channel estimate based on the pilot data and to the channel estimate based on the information data, and the weighted values are then combined to form a single combined estimate for the corresponding path. Once the combined estimate for each path is complete, it is applied to the corresponding finger prior to rake combiner 36. Next, method 50 continues to step 58.

In step 58, rake combiner 36 again performs the operations described above to apply the channel estimates to each path and to combine the results to output a single stream of estimated (i.e., soft) information data. In this regard, however, note that in step 58 the estimated information data is now based on the channel estimates which, from step 56, are based on weighted estimates pertaining to both the pilot and information data. As detailed below, this additional aspect of using the weighted channel estimates reduces the symbol error rate ("SER") as compared to the prior art.

In step 60, method 50 determines whether an additional iteration of the preceding steps is desired. If so, method 50 continues to step 62, whereas if an additional iteration is not desired, method 50 continues to step 64. Looking to the step 60 determination in greater detail, it may be based on various criteria. In one preferred embodiment, step 60 may implement a predetermined number of iterations as a threshold to determine whether an additional iteration is desired. For example, this predetermined number may be ascertained using simulations, and indeed may be as low as one or two. In any event, using this approach, step 60 determines whether the predetermined number of iterations have occurred, and if so the flow continues to step 64 while if not the flow continues to step 62. In an alternative preferred embodiment, step 60 may determine if another iteration is desired in a dynamic manner by examining the differences in a present set of hard decisions based on the most recent occurrence of step 58 versus the hard decisions based on the prior soft data. To implement this approach, the E_COMPLETE signal is maintained in the first state so that the estimated information data may pass to hard decision block 39 which then operates as described earlier to make hard decisions with respect to that data. Further, if this approach is used, then hard decision block 39 preferably includes sufficient storage capability to store both sets of hard decisions (i.e., present and prior), to compare these sets of data, and to present a result control signal to iterative channel estimator 34 based on the outcome of the comparison. Accordingly, if this comparison shows a sufficiently low amount of difference, if any, between the two sets of hard data, then step 60 determines that another iteration is not desired and transfers flow to step 64, whereas if another iteration is not desired, then the flow moves to step 64, which is modified for this instance as described below.

In step 62, which is reached when an additional iteration is desired, then additional actions are taken to facilitate determining the next channel estimate. More particularly, if step 60 is based on the predetermined number aspect described above, then in step 62 hard decision block 39 and information data removal block 40 both perform the operations described above, where here the operations relate to estimated information data that is estimated based on a channel impulse response derived from a weighted combination of pilot and information data. However, if step 60 is based on the hard decision comparison aspect described above, then in step 62 there is no need to again operate hard decision block 39 since it has already made its determination based on the presently estimated information data and, thus, only removal block 40 performs the operation described above. In either approach, therefore, by the conclusion of step 62 the hard symbol decisions corresponding to the most recent soft data are applied to the information data in buffers 32a and 32b thereby leaving in buffers 42a and 42b the amplitude and phase elements imposed on the data by the channel.

After step 62 is complete, method 50 returns to step 56, and thus, step 56 now repeats; for this repeated instance, however, buffers 42a and 42b now store the channel amplitude and phase distortions of the information data symbols based on the previous iteration rather than on the initial channel impulse response from step 52. Accordingly, once more step 56 provides these values to iterative channel estimator 24. As a result, iterative channel estimator 24 again applies a weight to the channel estimate based on the pilot data and to the channel estimate based on the information data, and the weighted values are then combined to form a single combined estimate for the corresponding path—here, however, the channel estimate based on the information data are improved due to one or more previous iterations. Further, in one approach, the weights applied in subsequent iterations are kept the same. In an alternative embodiment, the weights also may be adjusted for each iteration by re-evaluating the corresponding relative power ratio for the pilot and information data and the $P_e$ to be used in the formation of those weights; this approach, however, may not be desired or necessary since the changes in both relative power ratio and $P_e$ between iterations are relatively negligible and, thus, the corresponding change in weights which would be achieved by changing them in each iteration also may be negligible. In any event, thereafter, steps 58 and 60 now repeat given the more recent combined channel estimate derived from both the pilot data and information data. Thus, when step 60 is reached again, it once more determines whether another iteration is desired. Given the circular flow of these steps, one skilled in the art will appreciate that they may repeat additional times, whereby for each iteration a new and successive channel estimate for each path is determined and applied, and for each iteration the new channel estimate refines the previous estimate which also was based on a weighted combination of the pilot data estimate and the information data estimate. More particularly, therefore, note that each estimated impulse response is thus derived from a group of estimated data which was estimated in view of the immediately preceding one of the successive weighted combinations of the pilot data estimate and the information data estimate. Eventually, this iterative process should provided a satisfactory number of iterations, and which time method 50 concludes with step 64.

Step 64 is reached when a sufficient number of iterations have occurred in the above-described methodologies. At this point, iterative channel estimator switches the E_COMPLETE signal to its second state. As a result, the estimated information data output by rake combiner 36 is passed to the output of channel estimator 26 and thereby passes to decoder 30 as shown in FIG. 2. At this point, therefore, one skilled in the art should appreciate that the iterations and refined channel estimates arising from those iterations correspond to an improved SER and, thus, the estimated data output for decoding should provide an even greater improvement in SER after the decoding operation.

The preferred embodiment estimation method for combining the channel estimates based on the information data symbols and pilot data symbols is now described. After reception at receiver 20 (e.g., at an antenna), conversion to baseband, and despreading, the received signal r(i) during the $i^{th}$ symbol interval is given in the following Equation 1:

$$r(i)=\sqrt{P(i)}h(i)d(i)+n(i) \qquad \text{Equation 1}$$

where,

P(i) is the signal power;

h(i) is the channel impulse response to be estimated;

d(i) is the transmitted information data or pilot data symbol; and n(i) is the noise (including the multiple access interference).

Note also that in case that the received signal consists of more than one path, Equation 1 refers to one such path. In addition, the signal power is assumed to be the same for all information data symbols and equal to $P_d$. It is also assumed to be the same for all pilot data symbols and equal to $P_p$. The relation between $P_d$ and $P_p$ is shown in the following Equation 2:

$$\sqrt{P_p}=\rho\sqrt{P_d}=\rho\sqrt{P} \qquad \text{Equation 2}$$

where, ρ is the factor by which the power of the pilot data symbols differs from the power of the information data symbols.

The channel estimation during the $i^{th}$ symbol period is based on both pilot data and information data symbols as shown above, and the data decision feedback is assumed to remove the data modulation. In case that several signal paths exist, it is assumed that they are optimally combined (e.g. by rake receiver 36), the decision is based on the resulting combined signal and the information data feedback is individually applied to each of the received paths. Although wiener or any other type of filtering can be used, a simple moving average window method (lowpass filter) can provide in practice as good results as any other method and, moreover, it does not assume any knowledge about the (changing) channel and results to very simple implementation. The preferred embodiment uses a moving average window to estimate the channel response. Then, denoting by d(i) the tentative data decision, the channel estimate during the $i^{th}$ symbol period is given by the following Equation 3:

$$\hat{h}(i) = \frac{\sqrt{P}}{2K+1}\left\{\sum_{j=-K}^{-K+K_{dl}}[f_d(i+j)\hat{d}(i+j)(h(i+j)d(i+j)+n(i-j))]+ \right. \qquad \text{Equation 3}$$

-continued $$\sum_{j=-K+K_{d1}+1}^{-K+K_{d1}+K_{p1}} [f_p(i+j)(h(i+j)+n(i+j)/\rho)] + \ldots \Bigg\}$$

In the preferred embodiment, the channel estimate is based on 2K+1 symbols and using a centered window moving average method where the channel impulse response estimate is based on the same number of K previous and K future symbols relative to the reference symbol which is in the middle of the window. The first term in Equation 3 describes the channel estimate from the first block of $K_{d1}$ information data symbols. The second term describes the channel estimate from the first block of $K_{p1}$ pilot data symbols which, without loss of generality, are assumed to follow the first block of information data symbols. The total number of information data and pilot data symbols involved in the estimate of the channel impulse response can have a predetermined value or it can vary according to a Doppler frequency estimate indicating the coherent duration of the channel, if a Doppler frequency estimation unit exists at receiver 20.

Given the preceding Equations as well as the operation of channel estimator 26, it should be appreciated how both information data and pilot data symbols can be used for channel estimations and information data decisions can be iteratively obtained, each time with a different probability of error since the channel estimate is also different. Moreover, by appropriately choosing the factors $f_d$ and $f_p$ in Equation 3, the channel estimate progressively improves and the information data decisions progressively become more reliable until a threshold is reached at which further iterations do not meaningfully improve the decision reliability. The delay associated with the availability of data decisions is accounted for in the received signal in order for the data decision feedback to be properly applied. Subsequently, additional blocks of information data and pilot data symbols are added until a total of 2K+1 information data and pilot data symbols are used.

The factors $f_d$ and $f_p$ in the summation terms of Equation 3 represent the above-introduced weights used to account for the different reliability of the terms involved in the channel estimate. For example, information data decisions for different symbols may have different reliability while pilot data symbols, being perfectly demodulated (because their values are known), are always accurate. Thus, the factor $f_p$ does not depend on the time instant. The objective is to derive the optimum values for the coefficients $f_d$ and $f_p$ so that a quality measure is optimized. In the preferred embodiment, this optimum is achieved by using the mean square error for the channel impulse response estimate.

To simplify the notation and given the above, assume that a total of $K_D$ information data symbols and a total of $K_P$ pilot data symbols are used for channel estimation as in Equation 3. Then, omitting the time dependence to simplify the notation, the channel estimate during the symbol period of interest is given by the following Equation 4:

$$\hat{h} = \frac{\sqrt{P}}{2K+1} \left\{ \left[ \sum_{i=1}^{K_D} f_d(i)\left(\hat{d}(i)(h(i)d(i) + n(i))\right) \right] + f_p\left[ \sum_{i=1}^{K_P} h(i) + n(i)/\rho \right] \right\}$$

Equation 4 where, $K_D + K_P = 2K+1$.

The objective of the channel estimation method is to minimize the mean square error (MSE) between the actual and estimated channel responses. The MSE is given by the following Equation 5:

$$MSE = E[|h - \hat{h}|^2]$$

Equation 5

The minimization of the MSE can be performed analytically if it is further assumed that the data decision feedback reliability (or error probability) is the same for all information data, which is usually the case in practice. Then, $f_d(i) = f_d$, $\forall i$. The MSE is now given by the following Equation 6:

$$MSE = \frac{P}{(2K+1)^2} E\left[ \left| \sum_{i=1}^{K_D} \left( (f_d \hat{d}(i)d(i) - 1)h(i) + f_d \hat{d}(i)n(i) \right) + \sum_{i=1}^{K_P} ((f_p - 1)h(i) + f_p n(i)/\rho) \right|^2 \right]$$

Equation 6

In the preferred embodiment it is assumed that the combined channel noise and multiple access interference can be accurately modeled as a zero-mean additive white Gaussian noise process (no correlation between symbol intervals). In the preferred embodiment it is also assumed that the channel impulse response remains practically the same for the time window length over which the estimate is computed. Then, after some algebra the MSE can be shown as in the following Equation 7:

$$MSE = \frac{P|h|^2}{(K_D + K_P)^2}[K_D f_d(1 - 2P_e) + K_P f_p - (K_D + K_P)]^2 + \frac{\sigma^2}{(K_D + K_P)^2}(K_D f_d^2 + (K_P/\rho^2)f_p^2)$$

Equation 7 where, $|h|^2 = E[h(i)h^*(i+j)]$, $\forall i, j$;

$h^*$ denotes the complex conjugate of h;

$P_e$ is the probability of an incorrect decision feedback; and $\sigma^2$ is the noise variance.

The objective is to minimize the MSE with respect to the weight factors $f_d$ and $f_p$. Notice that the noise variance $\sigma^2$ is typically estimated at receiver 20 and $P|h|^2$ depends only on the received signal path amplitude which has better stability properties than the phase and can be estimated accurately. Hence, both $\sigma^2$ and $P|h|^2$ are known quantities and, as it will be shown shortly, only the received signal-to-noise ratio, combined over all received paths, is finally needed to obtain a minimum MSE channel estimate.

To minimize the MSE, the derivative with respect to $f_d$ and the derivative with respect to $f_p$ must simultaneously equal zero for the selected values of $f$ and $f_p$ and the obtained values must produce a minimum for the MSE. Then, after solving the preceding Equations in view of these derivatives equal to zero results in the following Equations 8 and 9;

$$f_d = \frac{(P|h|^2/\sigma^2)(1-2P_e)(1/\rho^2)(K_D+K_P)}{(K_P(P|h|^2/\sigma^2)+1/\rho^2)}$$
$$[K_D(1-2P_e)^2(P|h|^2/\sigma^2)+1] -$$
$$K_D K_P (1-2P_e)^2 (P|h|^2/\sigma^2)^2$$

Equation 8

$$f_p = \frac{(P|h|^2/\sigma^2)(K_D+K_P)}{(K_P(P|h|^2/\sigma^2)+1/\rho^2)}$$
$$[K_D(1-2P_e)^2(P|h|^2/\sigma^2)+1] -$$
$$K_D K_P (1-2P_e)^2 (P|h|^2/\sigma^2)^2$$

Equation 9

Eliminating the common factors from $f_d$ and $f_p$ has no effect on the resulting SER performance and considerably simplifies the evaluation of the two coefficients. This finally yields the following two Equations 10 and 11 for the weighting coefficients:

$$f_d = (1-2P_3)(1/\rho^2)$$   Equation 10

$$f_p = 1$$   Equation 11

In view of Equation 11, the optimum coefficient applied to the channel response estimate from the pilot data symbols is constant and equal to one. In view of Equation 10, the optimum coefficient for the channel response estimate from the information data symbols accounts for the incorrect decision feedback and for the possibility that the pilot data symbols have different power and hence different reliability. From Equation 10, it also appears preferably that the coefficient $f_d$ needs to change after every iteration to reflect the different error probability $P_c$ for the hard decision on the data after rake combining. However, since the variation of $P_c$ is small for the purposes of channel response estimation, $P_e$ may be assumed constant throughout as long as the total received SNR remains constant.

In practice, the error probability $P_c$ can be evaluated in several ways. For example, an assumption or a measurement can be made for the channel fading (e.g. Rayleigh) and then the error probability can be analytically evaluated after the SNR and the Doppler shift are measured at receiver 20. Another possibility to evaluate the error probability for the received data after rake combining is to re-encode and re-interleave the decoded data and compare them with the hard decisions for the data after the rake combiner. Small inaccuracies in the evaluation of the error probability $P_c$ do not cause significant degradation of the resulting performance relative to the optimum one.

Note also from Equation 10 that if the error probability $P_e$ gets closer to ½, the channel estimate is based proportionally more on the pilot data symbols, as it is expected. Also, as the error probability goes to zero, only the SNR difference of the information data and pilot data symbols affect the combining coefficients. Additionally, the optimum coefficient values do not depend on the number of data symbols and pilot symbols used to obtain the combined channel estimate. Finally, since the evaluation of the expected value of the MSE assumed randomness for the quantities whose expected value was derived in Equations 6 and 7 (product of data with data decision feedback, noise), in case of a single signal path in fading, the previous assumption is violated and the optimum coefficients are not accurately given by Equations 10 and 11. However, for typical CDMA communications, several paths can be resolved and incorrect data decision feedbacks are sufficiently randomized because of the independent fading of the demodulated paths at the rake receiver.

From the above, it may be appreciated that the above embodiments provide an improved channel impulse response estimation in a system where pilot data is transmitted along with the information data in a time shared fashion. Moreover, while the present embodiments have been described in detail, various substitutions, modifications or alterations could be made to the description set forth above without departing from the inventive scope, where various examples have been set forth above. Indeed, as other examples, while the preferred embodiment has been shown in the CDMA environment, the present inventive teachings may apply to other communication systems wherein the communication stream includes at least pilot data and information data. As another example, while channel estimator 26 has been shown to include certain blocks for performing known functions (e.g., rake combiner 36 and hard decision block 39), other comparable types of blocks and functions could be used in the place of these blocks. Still other examples will be ascertainable by one skilled in the art. For these reasons, therefore, the preceding examples are shown as preferred embodiments, but are not intended to restrict the inventive scope as is defined by the following claims.

What is claimed is:

1. A method of operating a communications receiver, comprising the steps of:

receiving a communications signal which is transmitted via a channel, the communications signal comprising received known pilot data and received information data, the known pilot data and information data being sequentially transmitted;

first, estimating a first channel impulse response for the channel, wherein the first channel impulse response is in response to the received known pilot data;

second, determining a group of estimated information data in response to the first channel impulse response;

third, estimating a second channel impulse response for the channel, wherein the second channel impulse response is in response to the group of estimated information data; and fourth, forming a combined channel impulse response for the channel, wherein the combined channel impulse response is in response to a combination of a first weight applied to the first channel impulse response and a second weight applied to the second channel impulse response;

wherein the received known pilot data has a first power;

wherein the received information data has a second power; and wherein the first weight differs from the second weight in response to a relationship between the first power and the second power.

2. The method of claim 1:

wherein the group of estimated information data comprises a first group of estimated information data; and further comprising the step of forming a second group of estimated information data by applying the combined channel impulse response to the received information data.

3. The method of claim 2 and further comprising the step of decoding the second group of estimated information data.

4. The method of claim 1:
wherein the combined channel impulse response comprises a first combined channel impulse response; and
further comprising the step of iteratively forming additional successive combined channel impulse responses, wherein each of the successive combined channel impulse responses is formed in response to a combination of the first weight applied to the first channel impulse response and the second weight applied to a channel impulse response which is derived from a group of estimated data which are estimated in view of an immediately preceding one of the successive combined channel impulse responses.

5. The method of claim 4 and further comprising the steps of:
for each one of the successive combined channel impulse responses, forming a corresponding group of estimated information data by applying the corresponding combined channel impulse response to the received information data; and
in response to a difference between a final group of estimated information data and an immediately preceding group of estimated data, outputting the final group of estimated information data.

6. The method of claim 5 and further comprising the step of decoding the final group of estimated information data.

7. The method of claim 4 and further comprising the steps of:
for each one of the successive combined channel impulse responses, forming a corresponding group of estimated information data by applying the corresponding combined channel impulse response to the received information data; and
in response to a predetermined number of iterations, outputting a final group of estimated information data formed in response to a final one of the combined channel impulse responses.

8. The method of claim 7 and further comprising the step of decoding the final group of estimated information data.

9. The method of claim 1 and further comprising, between the second and third steps, the steps of:
forming a plurality of hard information data decisions corresponding to the group of estimated information data;
removing data symbols from the received information data in response to the hard information data decisions thereby leaving a plurality of amplitude and phase corrective factors; and
wherein the step of estimating a second channel impulse response for the channel is in response to the plurality of amplitude and phase corrective factors.

10. The method of claim 1 wherein the first weight equals one and the second weight is inversely proportional to a factor, wherein the factor equals a ratio of the first power over the second power.

11. The method of claim 1:
wherein the estimated information data has a probability of error; and
wherein the first weight equals a product equal to a first factor of one minus two times the probability of error times a second factor of one over a ratio of the first power over the second power.

12. The method of claim 1 wherein the communications signal comprises a CDMA communications signal.

13. The method of claim 12 and further comprising the step of despreading the communications signal to form despread known pilot data and despread information data, wherein the first channel impulse response is in response to the despread known pilot data.

14. A method of operating a communications receiver, comprising the steps of:
receiving a communications signal which is transmitted via a channel, the communications signal comprising received known pilot data and received information data, the known pilot data and information data being sequentially transmitted;
first, estimating a first channel impulse response for the channel, wherein the first channel impulse response is in response to the received known pilot data;
second, determining a group of estimated information data in response to the first channel impulse response;
third, estimating a second channel impulse response for the channel, wherein the second channel impulse response is in response to the group of estimated information data;
fourth, forming a combined channel impulse response of the channel, wherein the combined channel impulse response comprises a first combined channel impulse response and is in response to a combination of a first weight applied to the first channel impulse response and a second weight applied to the second channel impulse response;
wherein the received known pilot data has a first power;
wherein the received information data has a second power; and
wherein the first weight differs from the second weight in response to a relationship between the first power and the second power;
fifth, iteratively forming additional successive combined channel impulse responses, wherein each of the successive combined channel impulse responses is formed in response to a combination of the first weight applied to the first channel impulse response and the second weight applied to a channel impulses response which is derived from a group of estimated data which are estimated in view of an immediately preceding one of the successive combined channel impulse responses; and
for each one of the successive combined channel impulse responses, forming a corresponding group of estimated information data by applying the corresponding combined channel impulse response to the received information data; and
in response to a predetermined number of iterations, outputting a final group of estimated information data formed in response to a final one of the combined channel impulse responses.

15. The method of claim 14 and further comprising the step of decoding the final group of estimated information data.

16. The method of claim 14 and further comprising, between the second and third steps, the steps of:
forming a plurality of hard information data decisions corresponding to the group of estimated information data;
removing data symbols from the received information data in response to the hard information data decisions thereby leaving a plurality of amplitude and phase corrective factors; and
wherein the step of estimating a second channel impulse response for the channel is in response to the plurality of amplitude and phase corrective factors.

17. The method of claim 16 wherein the first weight equals one and the second weight is inversely proportional to a factor, wherein the factor equals a ratio of the first power over the second power.

18. The method of claim 17:
wherein the estimated information data has a probability of error; and
wherein the first weight equals a product equal to a first factor of one minus two times the probability of error times a second factor of one over a ratio of the first power over the second power.

19. The method of claim 16:
wherein the estimated information data has a probability of error; and
wherein the first weight equals a product equal to a first factor of one minus two times the probability of error times a second factor of one over a ratio of the first power over the second power.

20. A communications receiver, comprising:
circuitry for receiving a communications signal which is transmitted via a channel, the communications signal comprising received known pilot data and received information data, the known pilot data and information data being sequentially transmitted;
circuitry for estimating a first channel impulse response for the channel, wherein the first channel impulse response is in response to the received known pilot data;
circuitry for determining a group of estimated information data in response to the first channel impulse response;
circuitry for estimating a second channel impulse response for the channel, wherein the second channel impulse response is in response to the group of estimated information data; and
circuitry for forming a combined channel impulse response for the channel, wherein the combined channel impulse response is in response to a combination of a first weight applied to the first channel impulse response and a second weight applied to the second channel impulse response;
wherein the received known pilot data has a first power;
wherein the received information data has a second power; and
wherein the first weight differs from the second weight in response to a relationship between the first power and the second power.

21. The communications receiver of claim 20 wherein the combined channel impulse response comprises a first combined channel impulse response, and further comprising circuitry for iteratively forming additional successive combined channel impulse responses, wherein each of the successive combined channel impulse responses is formed in response to a combination of the first weight applied to the first channel impulse response and the second weight applied to a channel impulse response which is derived from a group of estimated data which are estimated in view of an immediately preceding one of the successive combined channel impulse responses.

22. The communications receiver of claim 21 and further comprising:
for each one of the successive combined channel impulses responses, circuitry for forming a corresponding group of estimated information data by applying the corresponding combined channel impulse response to the received information data; and
circuitry for outputting a final group of estimated information data formed in response to a final one of the combined channel impulse responses.

* * * * *